(12) United States Patent
Hausig

(10) Patent No.: US 8,176,410 B1
(45) Date of Patent: May 8, 2012

(54) SYSTEM AND/OR METHOD FOR CONTENT CROPPING

(75) Inventor: Nils Hausig, Hamburg (DE)

(73) Assignee: Adobe Systems Incorporated, San Jose, CA (US)

( * ) Notice: Subject to any disclaimer, the term of this patent is extended or adjusted under 35 U.S.C. 154(b) by 1057 days.

(21) Appl. No.: 11/225,970

(22) Filed: Sep. 13, 2005

(51) Int. Cl.
*G06F 17/00* (2006.01)

(52) U.S. Cl. .................................. 715/201; 715/255

(58) Field of Classification Search .................. 715/255, 715/272, 277, 500
See application file for complete search history.

(56) References Cited

U.S. PATENT DOCUMENTS

| | | | | |
|---|---|---|---|---|
| 4,435,723 A * | 3/1984 | Seimiya et al. | ............... | 347/120 |
| 5,226,161 A * | 7/1993 | Khoyi et al. | .................. | 719/316 |
| 5,537,526 A * | 7/1996 | Anderson et al. | ............ | 715/209 |
| 5,544,302 A * | 8/1996 | Nguyen | ........................ | 715/837 |
| 5,581,686 A * | 12/1996 | Koppolu et al. | ............. | 715/784 |
| 5,634,019 A * | 5/1997 | Koppolu et al. | ............. | 715/744 |
| 5,651,108 A * | 7/1997 | Cain et al. | ..................... | 715/763 |
| 5,659,791 A * | 8/1997 | Nakajima et al. | ............ | 715/202 |
| 5,717,755 A * | 2/1998 | Shanton | ........................ | 713/166 |
| 5,771,384 A * | 6/1998 | Remington et al. | .......... | 719/318 |
| 5,961,590 A * | 10/1999 | Mendez et al. | ............... | 709/206 |
| 6,148,340 A * | 11/2000 | Bittinger et al. | ............. | 709/224 |
| 6,321,242 B1 * | 11/2001 | Fogg et al. | ..................... | 715/236 |
| 6,507,848 B1 * | 1/2003 | Crosby et al. | ................. | 707/102 |
| 6,708,221 B1 * | 3/2004 | Mendez et al. | ............... | 709/248 |
| 6,718,515 B1 * | 4/2004 | Conner et al. | ................ | 715/207 |
| 7,013,468 B2 * | 3/2006 | Abercrombie et al. | ....... | 719/328 |
| 7,103,838 B1 * | 9/2006 | Krishnamurthy et al. | .... | 715/202 |
| 7,269,604 B2 * | 9/2007 | Moore et al. | .......................... | 1/1 |
| 7,346,842 B1 * | 3/2008 | Hayton et al. | ................ | 715/234 |
| 7,548,334 B2 * | 6/2009 | Lo et al. | ........................ | 358/1.15 |
| 7,685,645 B2 * | 3/2010 | Doyle et al. | ..................... | 726/27 |
| 2003/0167158 A1 * | 9/2003 | Seed | ............................... | 703/11 |
| 2004/0010755 A1 * | 1/2004 | Hamada | ........................ | 715/513 |
| 2004/0172584 A1 * | 9/2004 | Jones et al. | .................... | 715/500 |
| 2004/0210842 A1 * | 10/2004 | Qamar | .......................... | 715/538 |
| 2005/0021862 A1 * | 1/2005 | Schroeder et al. | ............ | 709/246 |
| 2005/0216528 A1 * | 9/2005 | Cheng | ........................... | 707/202 |
| 2005/0216886 A1 * | 9/2005 | Washburn | ..................... | 717/110 |
| 2006/0089969 A1 * | 4/2006 | Brown et al. | ................. | 709/203 |
| 2007/0150496 A1 * | 6/2007 | Feinsmith | ..................... | 707/100 |

OTHER PUBLICATIONS

Microsoft Office Excel 2003 Printout , copyright 1985-2003, pp. 1-10.*
"LinkBack Project Developers Guide", Date: Mar. 29, 2005 URL: <http://linkbackproject.org/files/LinkBack-Dev-Guide.pdf>, pp. 1-18.*
Charles Jolley, "About LinkBack", date Jun. 28, 2004, URL:<http://linkback.nisus.com/about/>, pp. 1-6.*
Adame C. Engst, "LinkBack Brings Back Data Linking", Date: Mar. 7, 2005, URL:<http://tidbits.com/article/8011>, pp. 1-4.*

(Continued)

*Primary Examiner* — Laurie Ries
*Assistant Examiner* — Mustafa Amin
(74) *Attorney, Agent, or Firm* — Robert C. Kowert; Meyertons, Hood, Kivlin, Kowert & Goetzel, P.C.

(57) ABSTRACT

Embodiments of methods, apparatuses, devices and systems associated with content cropping are disclosed. One exemplary method comprises extracting one or more portions of content from a first file and cropping at least one portion of the one or more portions of content, and displaying the cropped extracted at least one portion of content as at least a portion of a second file.

30 Claims, 5 Drawing Sheets

OTHER PUBLICATIONS

"The e-zine Approach, Embedding and Linking Excel Worksheets into Word", Date:Aug. 18, 2005, URL:<http://www.glencoe.com/ps/computered/pas/article.php4?articleId=360>, pp. 1-6.*

Guy Hart-Davis, "Word Annoyances", Date: Jun. 28, 2005, O'Really Media, Inc., chapter 9, URL:<http://academic.safaribooksonline.com/print?xmlid=0596009542/wordannoy-CHP-9>, pp. 1-6.*

Paul McFedries, "Tricks fo the Microsoft Office Gurus", Date: Apr. 12, 2005, Que publishing, URL:<http://academic.safaribooksonline.com/print?xmlid=0789733692/ch06lev1sec2>, pp. 1-14.*

Scott DeWitt, "Basic Web Clipping Using WebSphere Portl Version 4.1", Date: Jun. 26, 2002, IBM, URL:<http://www.ibm.com/developerworks/websphere/library/techarticles/0206_dewitt/dewitt.html>, pp. 1-18.*

Ware Myers, "Taligent's Common Point: THe promis of Objects", Date: Mar. 1995, URL:<http://www.ibm.com/developerworks/websphere/library/techarticles/0206_dewitt/dewitt.html>, pp. 1-6.*

Potel et al. "MVP: Model-View-Presenter, the Taligent Programming Model for C++ and Java", Date:1996, Talignet Inc., URL:<http://www.wildcrest.com/Potel/Portfolio/mvp.pdf>, pp. 1-14.*

"Inside Taligent Technology—Embeddale Components", Date 1995, Addison-Wesley Publishing Company, pp. 1-4, URL:<http://www.wildcrest.com/Potel/Portfolio/InsideTaligentTechnology/WW82.htm>.*

Charles Jolley, "LinkeBack: Applications Working Together", Date:Apr. 15, 2005, URL:<http://macdevcenter.com/pub/a/mac/2005/04/15/1inkback.html?page=1>, 9 pages.*

U.S. Appl. No. 11/225,971, filed Sep. 13, 2005, Hausig.

U.S. Appl. No. 11/225,971, filed Sep. 13, 2005, 29 pages.

* cited by examiner

Fig. 2
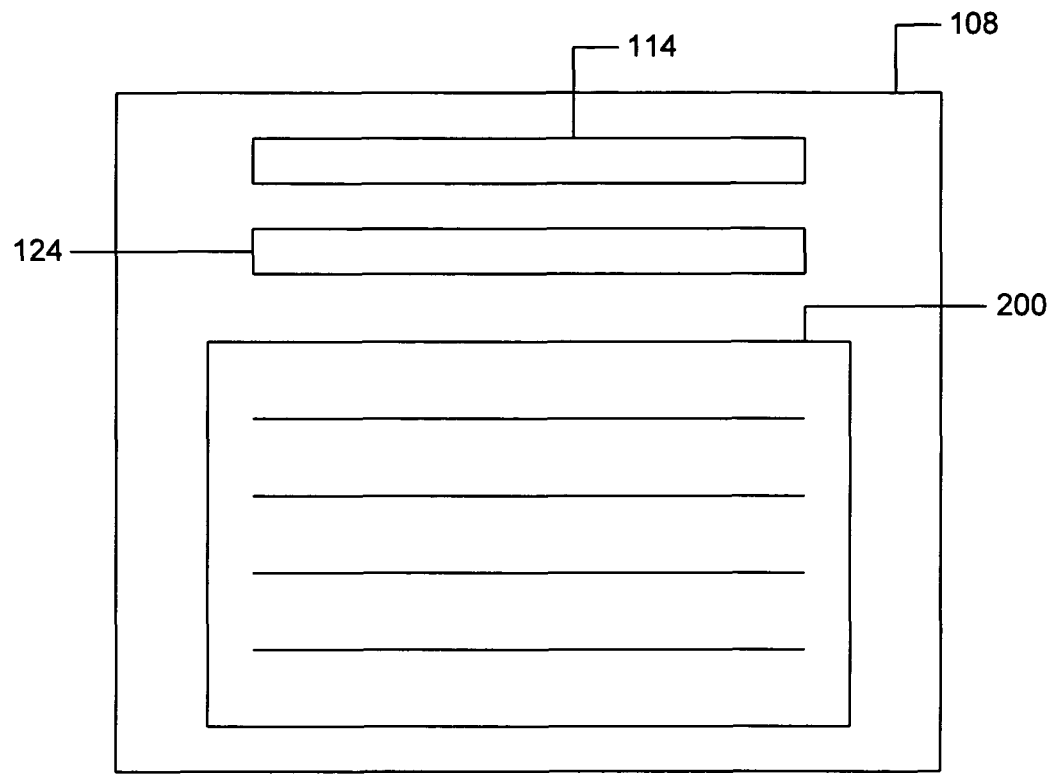
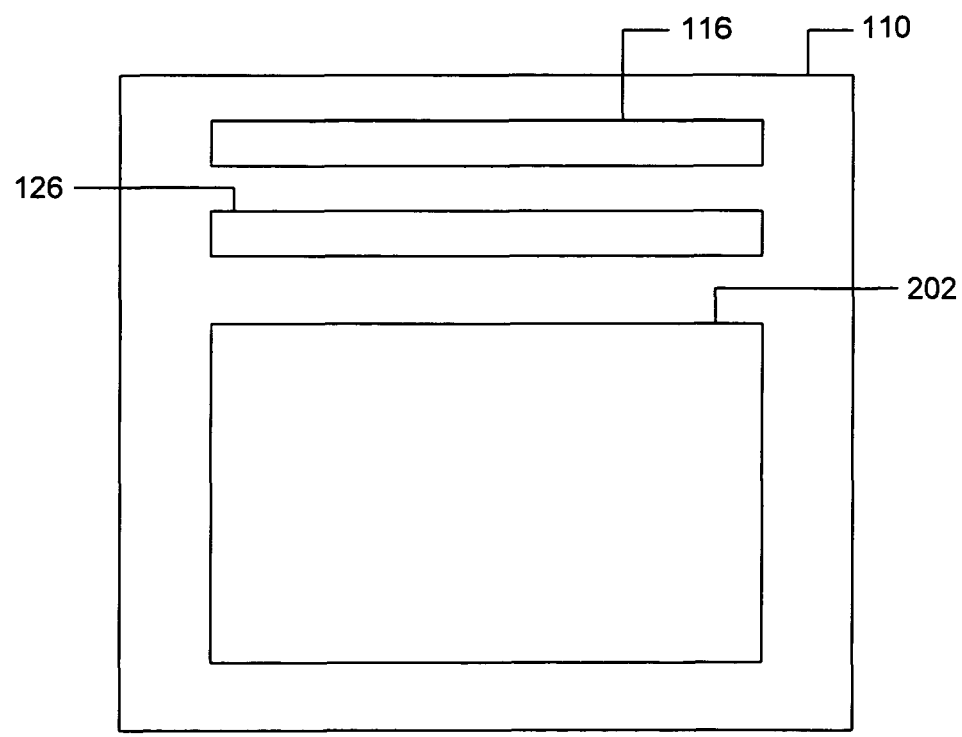

SYSTEM AND/OR METHOD FOR CONTENT CROPPING

BACKGROUND

Authoring tools, such as one or more software programs, may be capable of including in a first object, such as by linking to and/or copying, one or more external objects, such as one or more image files, text files, and/or combinations thereof. In the case of one or more external object that have been copied into the first object, authoring tools may be further capable of modifying the copies of the one or more external objects such as by selecting a portion of the external object for display, for example.

BRIEF DESCRIPTION OF DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description when read with the accompanying drawings in which:

FIG. 2 is a schematic diagram of an embodiment, such as one or more container objects;

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail so as not to obscure claimed subject matter.

Figure 1:
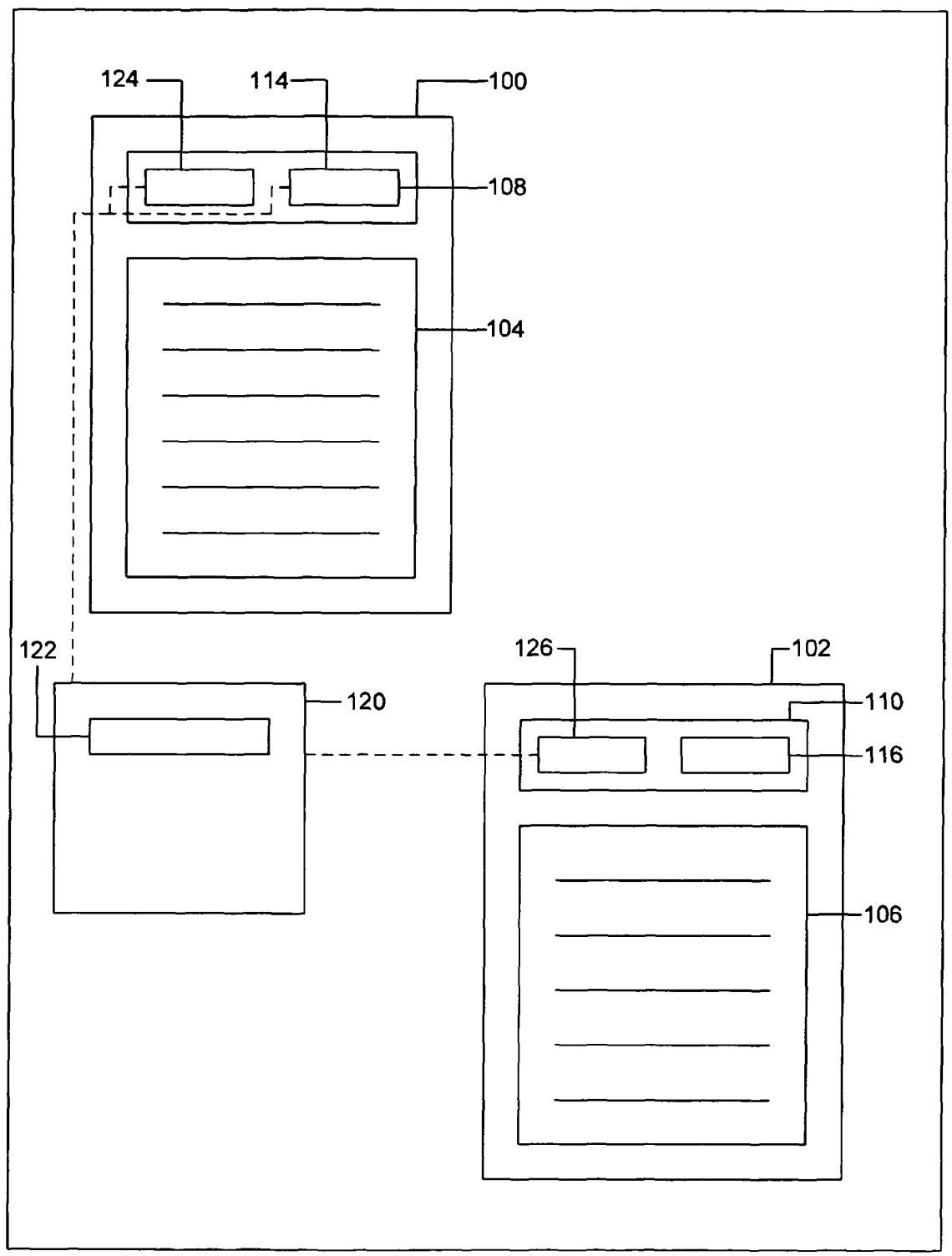
FIG. 1 is a schematic diagram of an embodiment comprising, such as a user interface including one or more documents.

FIG. 1 is a schematic diagram of an embodiment 10, such as a user interface, a graphical user interface, and/or a document generation tool. In this context a user interface, a graphical user interface, and/or a document generation toll may comprise one or more portions of software which may allow a user to interact one or more, for example, by one or more input devices of a computing system and/or computing platform. In this context, embodiment 10 may include and/or, at least in part, form one or more documents, such as document 100, and/or document 102, for example. In this context, a document may mean one or more computing system readable files capable of at least in part conveying one or more pieces of information, such as one or more portions of text and/or data stored in one or more computing system and/or computing platform readable files, for example. For additional example, a document may comprise data stored in one or more files in memory and/or a visual representation, such as a visual rendering of the data with one or more computer displays, for example, such as in conjunction with a graphical user interface. Though it should be noted that this is merely an illustrative example relating to a document and that claimed subject matter is not limited in this regard. By way of example, documents 100 and/or 102 may comprise one or more respective portions of text, such as text portion 104 and/or text portion 106, which may be stored in memory and/or rendered for display with a computing platform (not shown), for example. It should be noted that this is merely an illustrative example relating to one or more documents and that claimed subject matter is not limited in this regard. As one potential example, a computing system and/or computing platform may include one or more processing units or processors, one or more input/output devices, such as a display, a keyboard and/or a mouse, and/or one or more memories, such as static random access memory, dynamic random access memory, flash memory, and/or a hard drive, although, again, claimed subject matter is not limited in scope to this example For further example, documents 100 and/or 102 may further comprise one or more modules and/or objects, such as container object 108 and/or container object 110. In this context, a module may mean one or more sets of computer system executable instructions, such as one or more subroutines, one or more software programs, and/or one or more objects, for example. In this context, an object may mean one or more computing system and/or computing platform executable instructions along with one or more data units and/or portions of data, for example. In this context, a container object may mean one or more objects capable of linking to, displaying, and/or extracting at least a portion of one or more files and/or documents, for example. In this context, a container object may be stored in memory and/or visually rendered, for example, by one or more user interfaces. By way of example, container object 108 and/or container object 110 may comprise one or more computing system and/or computer platform executable instructions and/or one or more respective links to one or more portions of one or more files and/or documents. Though it should be noted that this is merely an illustrative example relating to a container object and that claimed subject matter is not limited in this regard. Additionally, container object 108 and/or container object 110 may comprise computing system executable instructions capable of extracting at least one or more determined portions of one or more files and/or documents, for example. Though, again, it should be noted that this is merely an illustrative example relating to a container object and that claimed subject matter is not limited in this regard. As one possible example, container object 108 and/or container object 110 may comprise a respective link, such as link 114 and/or link 116, for example, to a first file 120 and/or a first portion 122 of first file 120, and/or one or more instructions, such as instructions 124 and/or instructions 126, though, again, it should be noted that claimed subject matter is not limited in scope to this example. In this context, instructions 124 and/or instructions 126 may, when executed by one or more computing systems and/or computing platforms, result in container object 108 and/or container object 110 extracting data, such as first file 120 and/or first portion 122 of first file 120, for possible use by container object 108 and/or container object 110, for example. However, it should be noted that this is merely an illustrative example relating to a container object and that claimed subject matter is not limited in this regard.

FIG. 2 is a schematic diagram of an object, such as one or more container objects, such as container object 108 and/or container object 100, for example. As mentioned above, container object 108 may comprise one or more computer system executable instructions, such as instructions 124 and/or 126, respectively, and/or one or more pieces of information, such as link 114 and/or link 116, respectively. In this context, link 114 and/or link 116 may comprise one or more pointers, such as a universal resource locator (URL), to a document, file, and/or portion of a document and/or file, such as file 120 and/or first portion 122 of file 120, for example. However, it should be noted that this is merely an illustrative example of a container object and that claimed subject matter is not limited in this regard. For example, instructions 124 and/or 126 may comprise one or more instructions which may, when executed, result in container object 108 and/or container object 110 reading and/or extracting a file and/or a portion of a file, such as file 120 and/or first portion 122, for example. For further example, instructions 124 and/or instructions 126 may, when executed, at least in part, form an extracted text box 200 and/or an extracted text box 202, respectively, for example. In this context, extracted text box 200 and/or extracted text box 202 may comprise a portion container object 108 and/or container object 110, capable of displaying, such as through one or more user interfaces, an extracted file and/or an extracted portion of a file, such as file 120 and/or first portion 122, for example. Though it should be noted that this is merely an illustrative example relating to a container object and that claimed subject matter is in no way limited in this regard. For further example, instructions 124 and/or instructions 126, may when executed, result in placing at least a portion of extracted text in extracted text box 200 and/or extracted text box 202, respectively, such as for displaying the placed at least a portion of extracted text. It should be noted that this is merely an illustrative example of an object and that claimed subject matter is not limited in this regard.

Figure 3:
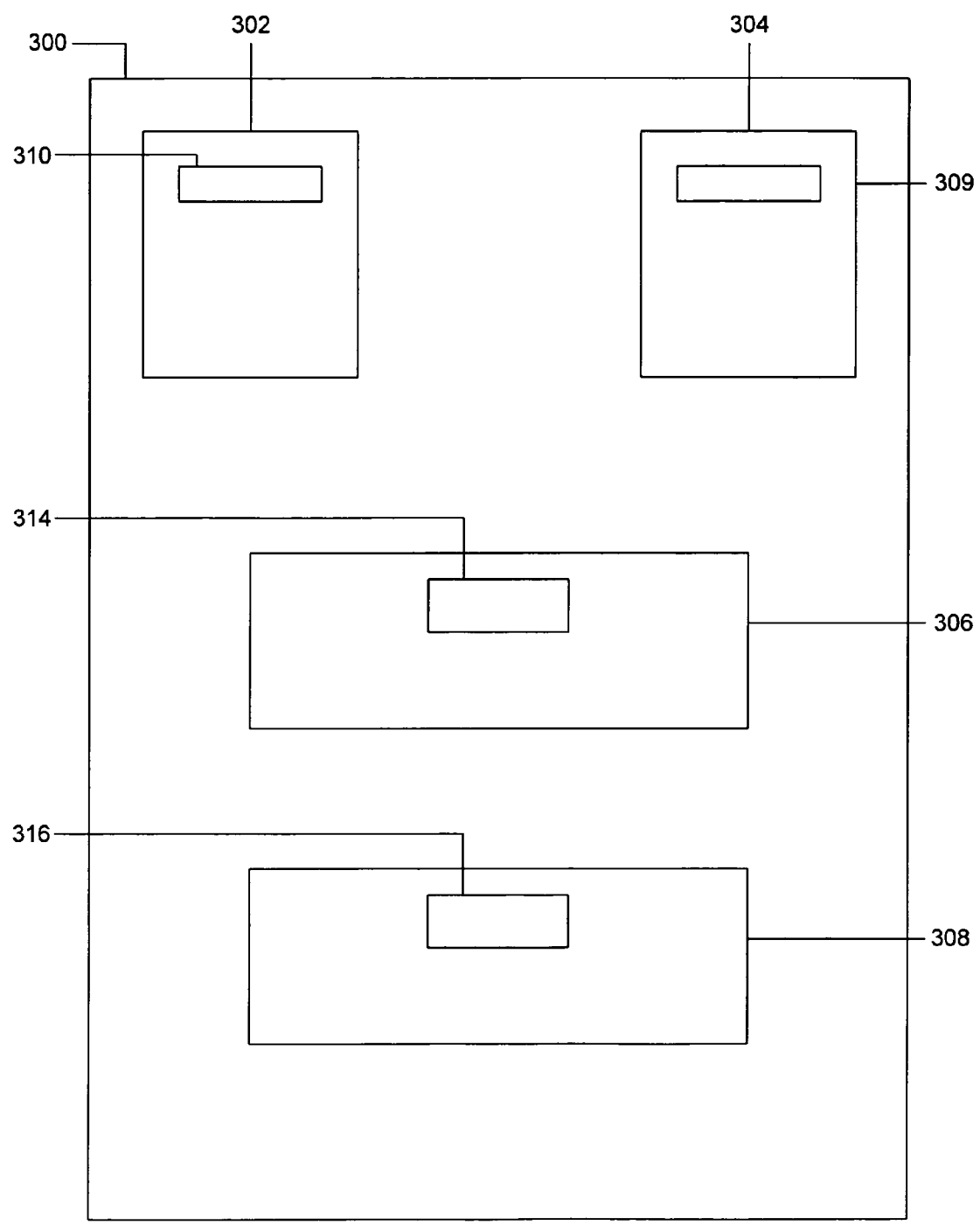
FIG. 3 is an embodiment, such as a document generation engine and/or authoring tool.

FIG. 3 is an embodiment 300, such as a document generation engine and/or authoring tool, which may be accessible to a user through an interface, such as a graphical user interface, and/or which may be stored in memory of a computing system and/or computer platform, for example. Embodiment 300 may comprise one or more objects, subroutines, and/or other software, firmware, shareware, freeware, and/or combinations thereof, such as, a document composer 302, a text composer 304, a container component generator 306, and/or a content cropper 308, for example. In this context, document composer 302 may comprise one or more computing system and/or computing platform executable instructions 310 capable of forming one or more user interfaces, for example. In this context the one or more user interfaces may be capable of creating and/or modifying one or more documents, at least in part in response to one or more user inputs, such as keystrokes on a keyboard and/or one or more pointing devices, such as one or more mice, to name but a few examples. Though it should be noted that this is merely an illustrative example relating to a document generator and that claimed subject matter is not limited in this regard. In this context, instructions 310 may additionally, when executed by a computing system and/or computing platform, result in generating one or more documents, such as document 100 and/or document 102, which may be stored in memory and/or rendered in a user interface such as embodiment 10, for example. Though it should be noted that this is merely an illustrative example relating to a document generator and that claimed subject matter is not limited in this regard.

For example, in this context, text composer 304 may comprise one or more instructions, such as computing system and/or computing platform executable instructions 309. In this context, instructions 309 may, when executed by a computing system and/or computing platform, generate one or more interfaces capable of allowing a user to input one or more portions of text, such as by using a keyboard and/or other input device, for example. Though it should be noted that this is merely an illustrative example relating to a text generator and that claimed subject matter is not limited in this regard. For further example, container component generator 306 may, in this context, comprise one or more instructions, such as one or more computing system and/or computing platform executable instructions 314, for example. Instructions 314 may, when executed by a computing system and/or computing platform, result in generating one or more container objects, such as container object 108 and/or container object 110, for example. In this context, the one or more container object may be formed, at least in part, in response to an input from a user, such as selecting one or more choices from a drop down menu and/or clicking on one or more icons, to name but a few examples. Though it should be noted that this is merely an illustrative example and that claimed subject matter is not limited in this regard.

For additional example, content cropper 308 may, in this context, comprise one or more instructions, such as one or more computing system and/or computing platform executable instructions 316. By way of example, instructions 316 may, when executed by a computing system and/or computing platform, generate a content cropping interface and/or tool (not shown). The content cropping interface may allow a user to specify and/or determine one or more portions of a file, such as file 120, to include for rendering and/or display in a document, such document 100 and/or document 102, for example. In this context crop may mean to specify one or more portions of a file, such as highlighting one or more portions and/or excluding one or more portions, for example. In this context specify may mean to name and/or state to one or more determined levels of detail. For example, in this context, specifying one or more portions of the file may comprise stating a number of characters, words, sentences, paragraphs, pages, other data units, and/or combinations thereof. In this context determine may mean to settle or decide, such as by choosing one or more possibilities, to fix the form, position, and/or character of, to bring about as a result, to set one or more boundaries, to limit in extent and/or scope, to put and/or set an end and/or beginning, and/or combinations thereof, for example. Though it should be noted that this is merely an illustrative example relating to a content cropping interface and/or tool and that claimed subject matter is not limited in this regard.

Figure 4:
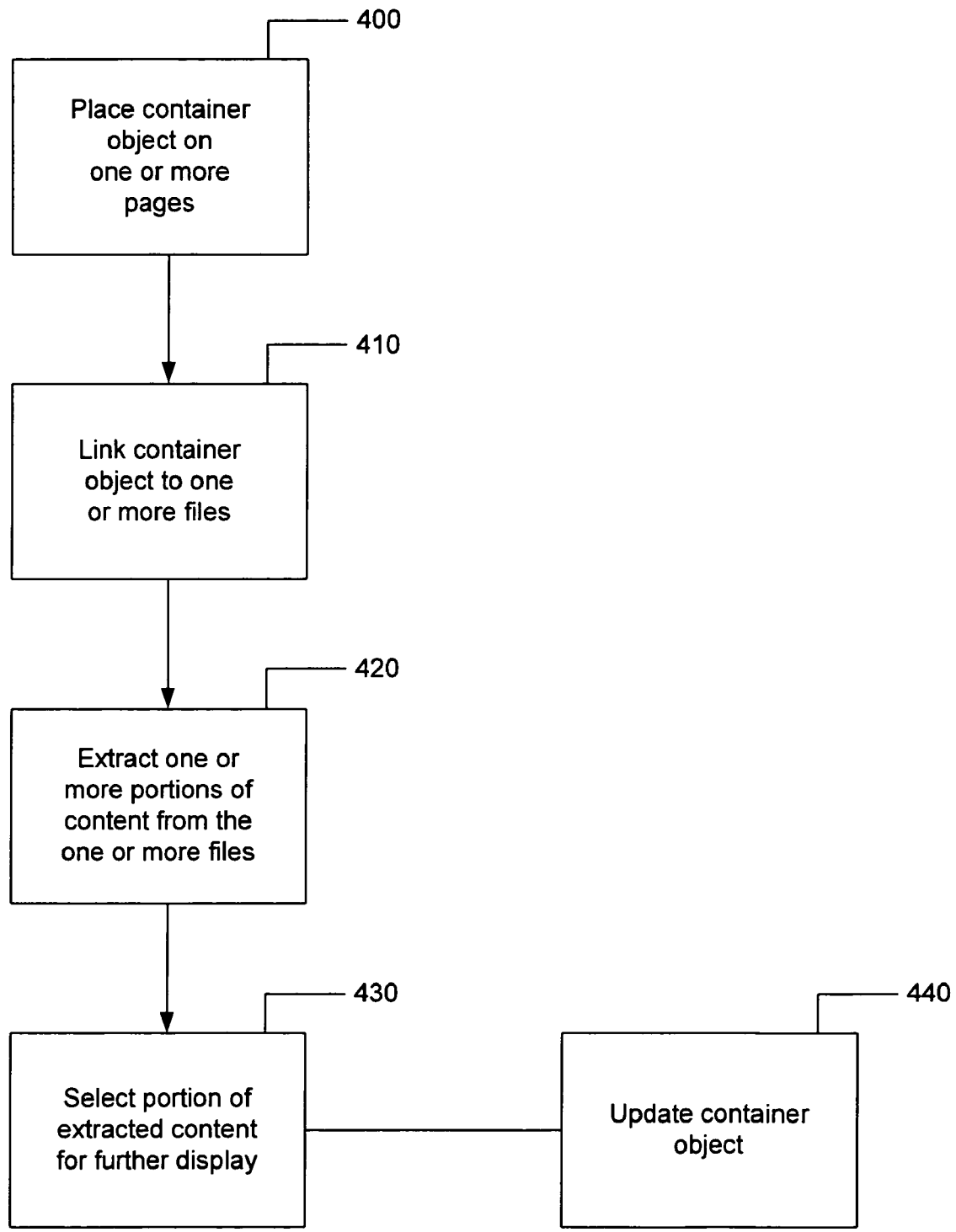
FIG. 4 is a flowchart depicting an embodiment, such as one or more processes.

FIG. 4 is a flow chart of an embodiment, such as one or more processes relating to content cropping, for example. With regard to box 400, one or more container objects, such as container objects 108 and/or 110 may be formed, inserted and/or placed on one or more pages, such as document 100 and/or document 102, for example. In this context the one or more container object may be formed, for example in computing system's memory and/or in a graphical user interface, at least in part in response to one or more events, such as in response to one or more user initiated event and/or events initiated in one or more other manners, for example. With regard to box 410, the one or more container objects may be linked to one or more files, such as file 120, for example, such as in response to one or more user commands and/or other instruction, for example.

With regard to box 420, in this context, the container object may read, copy, and/or extract one or more portions of content from the one or more files, for example. In addition, the container object may display, such as in one or more user interfaces, the read, copied, and/or extracted one or more portions of content from the one or more files as at least a portion of the document, for example. With regard to box 430, one or more portions of the read, copied, and/or extracted content may be selected for further display as at least a portion of the document. In this context, a user may select the one or more portions of the read, copied, and/or extracted content, by, for example, highlighting one or more portions of the read, copied, and/or extracted content, for example. In this context highlighting may mean to make prominent and/or emphasize, for example by using one or more pointing devices associated with a computing system. By way of example, highlighting may comprise a user clicking on one or more portions of text in a graphical user interface, so that the one or more portions of text are made prominent relative to other text. Though, again, it should be noted that this is merely an illustrative example relating to a container object and that claimed subject matter is not limited in this regard. Additionally, a user may select the one or more portions of the read, copied, and/or extracted content, for example, by determining one or more cropping parameters for the container object. For example, a user may determine a number of characters, words, sentences, and/or paragraphs to select. Additionally, a user may determine a range of the read, copied, and/or extracted content, such as by specifying a starting and ending point within the extracted content, for example. In this context a user may provide the determined range to a user interface, for example. In addition, once a user has selected the one or more portions of the read, copied, and/or extracted content, that selection may be saved, such as along with the link and/or the container object. For example, the stored selection may be, at least in part, used as described more fully below. Though, again, is should be noted that these are merely examples of selecting one or more portions of extracted content and that claimed subject matter is not limited in this regard.

With regard to box 440, the container object may be updated from time to time, such as in response to a user request and/or one or more other events, such as after a period of time and/or after the linked file has been modified and/or saved, to name but a examples. In this context updating a container object may, at least in part, comprise removing the read, copied, and/or extracted portions of content from the container object, for example. Additionally, updating the container object may, at least in part, further comprise re-extracting the one or more portions of content from the file, based at least in part on the saved selection discussed above, for example. In addition, updating the container object may, at least in part, further comprise selecting one or more portions of the re-extracted one or more portions of content, such as by selecting a different portion and/or range selected with regard to box 430, for example. In this way, the selected one or more portions of the file may be at least partially updated in the event that the selected one or more portions of content have been modified and/or updated in the file, for example. Though, of course, it should be noted that this is merely an illustrative example of updating a container object and that claimed subject matter is not limited in this regard.

Figure 5:
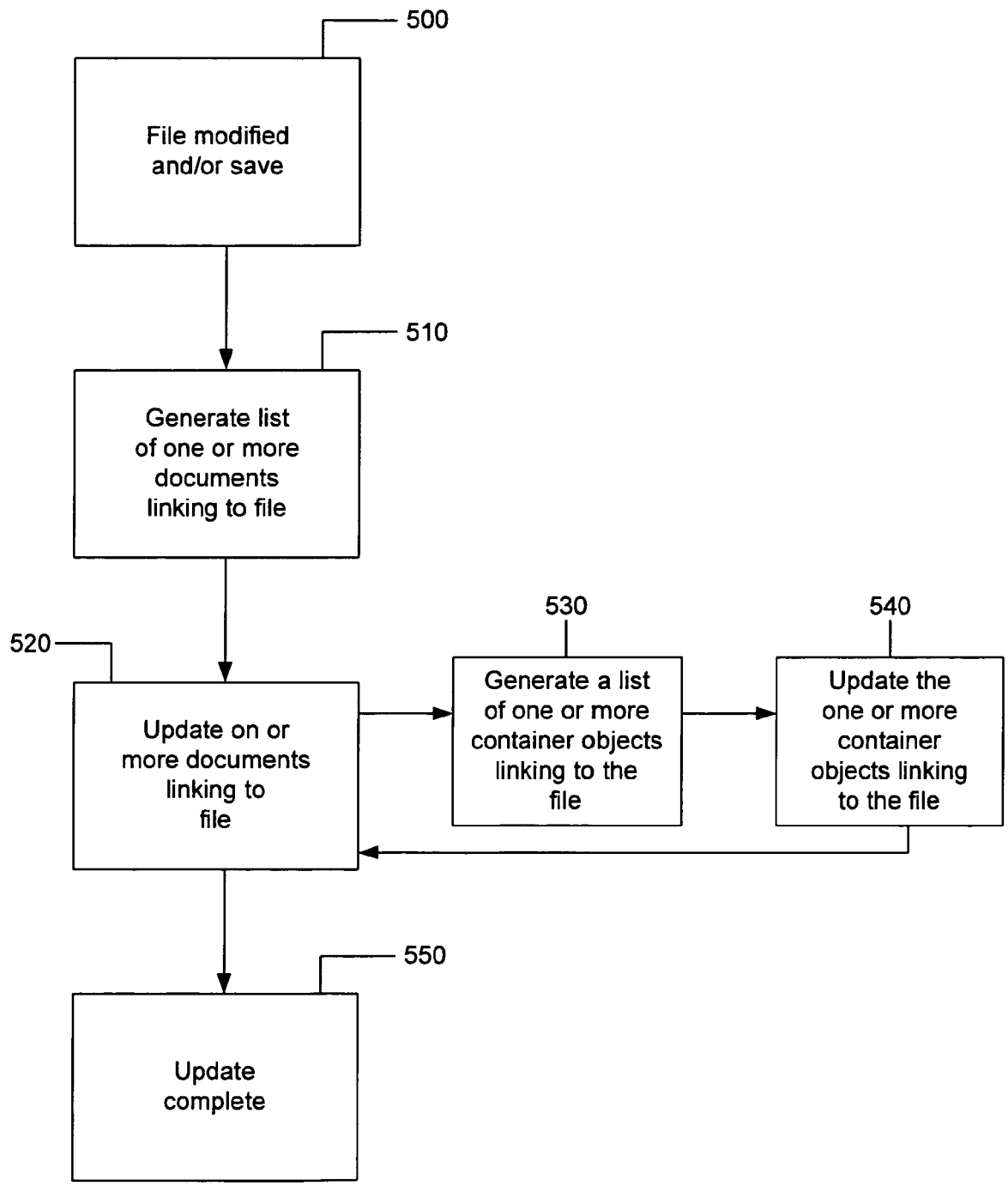
FIG. 5 is a flow chart depicting an embodiment, such as one or more processes.

FIG. 5 is a flow chart of an embodiment, such as a container object update process, for example. With regard to box 500, an event, such as modifying and/or saving a file that has been linked to by one or more documents and/or one or more container objects, such as file 120, may trigger and/or initiate one or more update processes, for example. By way of example, at least in part in response to a triggering event, one or more programs, such as embodiment 10 and/or embodiment 300, for example, may initiate one or more update processes. With regard to box 510, the one or more programs, may generate a listing of one or more documents, such as document 108 and/or document 110, that may include one or more links to one or more portions of the file, for example. With regard to box 520, the embodiment may update the one or more document that may include a link one or more links to one or more portions of the file, for example. Though, it should be noted that this is merely an illustrative example relating to an update process and that claimed subject matter is not limited in this regard.

With regard to box 530, for the one or more documents linking to the one or more portions of the file, the one or more program may generate a respective listing of one or more container objects which may include one or more links to one or more portions of the file, such as container object 108 and/or container object 110, for example. With regard to box 540, the embodiment may update the one or more container objects of the one or more documents, such as by the update process described with regard to box 440, for example. Though, of course, it should be noted that this is merely an illustrative example relating to an update process and that claimed subject matter is not limited in this regard. With regard to box 550, once the one or more documents, and/or respective one or more container objects, linking to the file have been updated then the update process may end, for example. Though, again, it should be noted that the above is merely an illustrative example relating to an update process and that claimed subject manner is in no way limited in this regard.

It will, of course, also be understood that, although particular embodiments have just been described, claimed subject matter is not limited in scope to a particular embodiment or implementation. For example, one embodiment may be in hardware, such as implemented on a device or combination of devices, as previously described, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, claimed subject matter is not limited in scope to this example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. An apparatus, comprising:
 a processor adapted to execute instructions;
 a module operable, in response to execution of said instructions by said processor, to perform:
  receiving input, via a text-cropping user interface, specifying a portion of a file storing text;

in response to said receiving, generating a container object that contains both a link referencing the file and computer-executable instructions for extracting text from the file for display within a document;
inserting the container object into the document, wherein the document is separate from the file;
executing the computer-executable instructions of the container object to:
  extract a copy, via the link, of the text stored in the specified portion of the file;
  store the extracted copy of the text in the container object; and
  cause the extracted copy of the text to be displayed within the document;
subsequent to said displaying the extracted copy, subsequent to a modification of the text stored in the specified portion of the file, and in response to an event, automatically updating the container object, wherein said updating comprises executing the computer-executable instructions of the container object to:
  re-extract another copy, via the link, of the text stored in the specified portion of the file, wherein the re-extracted other copy includes the modification of the text stored in the specified portion of the file;
  store the re-extracted copy of the text in the container object; and
  cause the re-extracted other copy of the text to be displayed within the document.

2. The apparatus of claim 1, wherein said module is further operable to examine the file and to perform said updating the container object at one or more determined times.

3. The apparatus of claim 2, wherein said module is further operable to examine the file by comparing a modification date of the file to a modification date of the extracted copy of the text stored in the container object.

4. The apparatus of claim 1, wherein said automatically updating the container object is performed in response to the file being modified.

5. The apparatus of claim 1, wherein said input comprises a starting point and an ending point of the specified portion of the file.

6. The apparatus of claim 1, wherein said input specifying a portion of the file storing text comprises a user selection of text of the file within the text-cropping user interface.

7. The apparatus of claim 6, wherein the user selection comprises input highlighting one or more portions of the file via the text-cropping user interface.

8. The apparatus of claim 1, wherein said input comprises specification of one or more cropping parameters.

9. The apparatus of claim 8, wherein the cropping parameters comprise one or more numbers specifying an extent of the text stored in the file.

10. A method, comprising:
executing instructions, by a processor, to direct the processor to perform:
  receiving input, via a text-cropping user interface, specifying a portion of a file storing text;
  in response to said receiving, generating a container object that contains both a link referencing the file and computer-executable instructions for extracting text from the file for display within a document;
  inserting the container object into the document, wherein the document is separate from the file;
  executing the computer-executable instructions of the container object to:
    extract a copy, via the link, of the text stored in the specified portion of the file;
    store the extracted copy of the text in the container object; and
    cause the extracted copy of the text to be displayed within the document;
  subsequent to said displaying the extracted copy, subsequent to a modification of the text stored in the specified portion of the file, and in response to an event, automatically updating the container object, wherein said updating comprises executing the computer-executable instructions of the container object to:
    re-extract another copy, via the link, of the text stored in the specified portion of the file, wherein the re-extracted other copy includes the modification of the text stored in the specified portion of the file;
    store the re-extracted copy of the text in the container object; and
    cause the re-extracted other copy of the text to be displayed within the document.

11. The method of claim 10, wherein said input comprises input highlighting one or more portions of the file via the text-cropping user interface.

12. The method of claim 10, wherein said input comprises a starting point and an ending point for the specified portion of the file.

13. The method of claim 10, wherein the input comprises specification of one or more cropping parameters.

14. The method of claim 13, wherein the cropping parameters comprise one or more numbers specifying an extent of the text stored in the file.

15. The method of claim 10, wherein said automatically updating the container object is based at least in part on one or more triggers.

16. The method of claim 15, wherein said one or more triggers comprise modifying, saving, and/or accessing the separate document.

17. The method of claim 10, wherein said automatically updating the container object is based on one or more differences between the extracted copy of the text stored in the container object and the text stored in the specified portion of the file.

18. The method of claim 10, wherein said input specifying a portion of the file storing text comprises user selection of text of the file within the text-cropping user interface.

19. An article comprising: a storage medium having stored thereon instructions which, in response to being executed by a processor, direct said processor to perform:
  receiving input, via a text-cropping user interface, specifying a portion of a file storing text;
  in response to said receiving, generating a container object that contains both a link referencing the file and computer-executable instructions for extracting text from the file for display within a document;
  inserting the container object into the document, wherein the document is separate from the file;
  executing the computer-executable instructions of the container object to:
    extract a copy, via the link, of the text stored in the specified portion of the file;
    store the extracted copy of the text in the container object; and
    cause the extracted copy of the text to be displayed within the document;
  subsequent to said displaying the extracted copy, subsequent to a modification of the text stored in the specified portion of the file, and in response to an event, automatically updating the container object, wherein said updating comprises executing the computer-executable instructions of the container object to:

re-extract another copy, via the link, of the text stored in the specified portion of the file, wherein the re-extracted other copy includes the modification of the text stored in the specified portion of the file;

store the re-extracted copy of the text in the container object; and cause the re-extracted other copy of the text to be displayed within the document.

20. The article of claim 19, wherein said input comprises highlighting of one or more portions of the file via the text-cropping user interface.

21. The article of claim 19, wherein said input comprises a starting point and an ending point for the specified portion of the file.

22. The article of claim 19, wherein said input comprises specification of one or more cropping parameters.

23. The article of claim 22, wherein the cropping parameters comprise one or more numbers specifying an extent of the text stored in the file.

24. The article of claim 19, wherein said automatically updating the container object is based at least in part on one or more triggers.

25. The article of claim 24, wherein said one or more triggers comprise modifying, saving, and/or accessing the separate document.

26. The article of claim 19, wherein said automatically updating the container object is based on one or more differences between the extracted copy of the text stored in the container object and the text stored in the specified portion of the file.

27. The article of claim 19, wherein said input specifying a portion of the file storing text comprises a selection of text of the file within the text-cropping user interface.

28. An apparatus, comprising:

a content linking means for linking a file storing text with at least a portion of a document that is separate from the file, wherein a portion of the file storing text is specified via input to a text-cropping user interface, and wherein said linking comprises:

in response to receiving said input, generating a container object that contains both a link referencing the file and computer-executable instructions for extracting text from the file for display within the separate document; and inserting the container object into the separate document;

means for executing the computer-executable instructions of the container object to:

extract a copy, via the link, of the text stored in the specified portion of the file;

store said extracted copy of the text in the container object; and cause the extracted copy of the text to be displayed within the separate document; and means for, subsequent to said displaying the extracted copy, subsequent to a modification of the text stored in the specified portion of the file, and in response to an event, automatically updating the container object, wherein said updating comprises executing the computer-executable instructions of the container object to:

re-extract another copy, via the link, of the text stored in the specified portion of the file, wherein the re-extracted other copy includes the modification of the text stored in the specified portion of the file;

store the re-extracted copy of the text in the container object; and cause the re-extracted other copy of the text to be displayed within the separate document.

29. The apparatus of claim 28, and further comprising a comparing means for determining one or more changes in said file.

30. The apparatus of claim 29, wherein said automatically updating the container object is performed based at least in part on the determined one or more changes in said file.

* * * * *